United States Patent [19]

McDowell

[11] Patent Number: 4,771,743
[45] Date of Patent: Sep. 20, 1988

[54] SPARK PLUG WIRE LOOM

[75] Inventor: James E. McDowell, Orange County, Fla.

[73] Assignee: McDowell International Packaging Systems, Inc., Orlando, Fla.

[21] Appl. No.: 85,801

[22] Filed: Aug. 17, 1987

[51] Int. Cl.$^4$ ............................................. H02G 3/26
[52] U.S. Cl. ......................... 123/143 C; 123/169 PA; 174/72 A
[58] Field of Search ...... 123/143 C, 169 PA, 169 PH; 174/72 A

[56] References Cited

U.S. PATENT DOCUMENTS

| | | | |
|---|---|---|---|
| 1,403,827 | 1/1922 | Armathes | 174/72 A |
| 2,997,531 | 8/1961 | Oldham et al. | 174/72 A |
| 3,342,168 | 9/1967 | Burdette | 123/169 PA |
| 4,494,520 | 1/1985 | Hurwitz | 174/72 A X |

Primary Examiner—Willis R. Wolfe
Attorney, Agent, or Firm—Richard H. Stern

[57] ABSTRACT

A spark plug wire loom is described in which an axially rotatable support routes the wiring and keeps the wires separated. A tapered head mounts a separator to a T-nut mount so that the separator pops into place into a recess in the T-nut mount and is kept there.

10 Claims, 2 Drawing Sheets

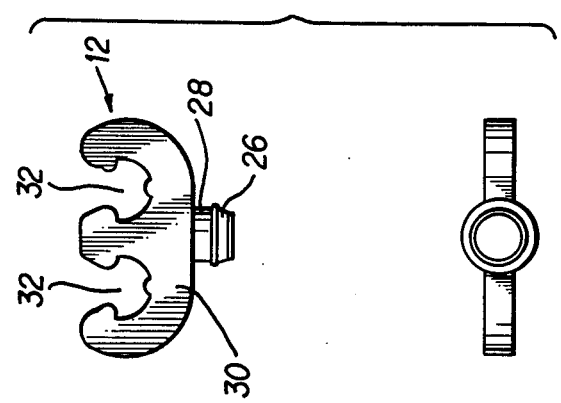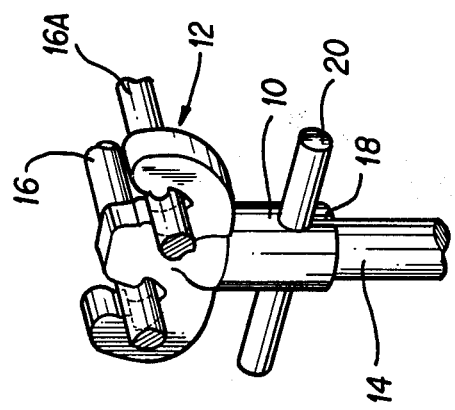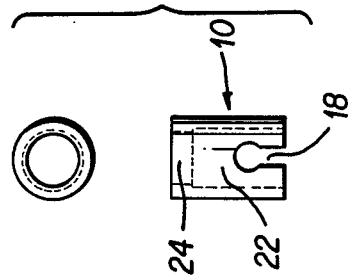
FIG. 2
FIG. 3
FIG. 1

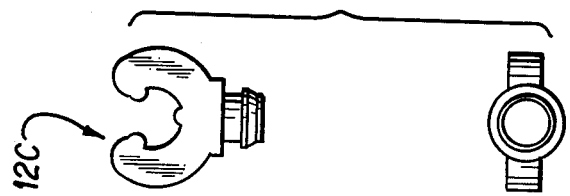
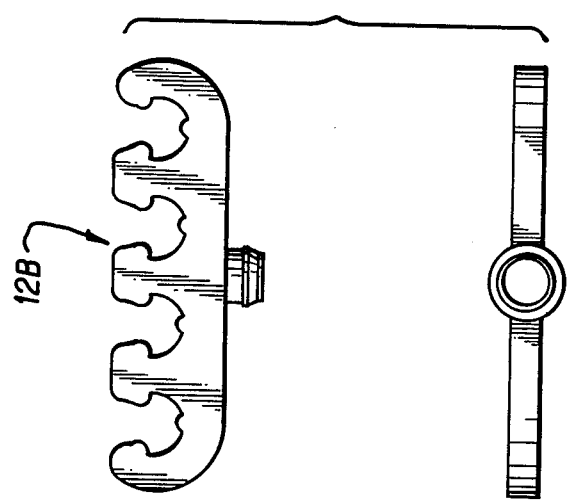
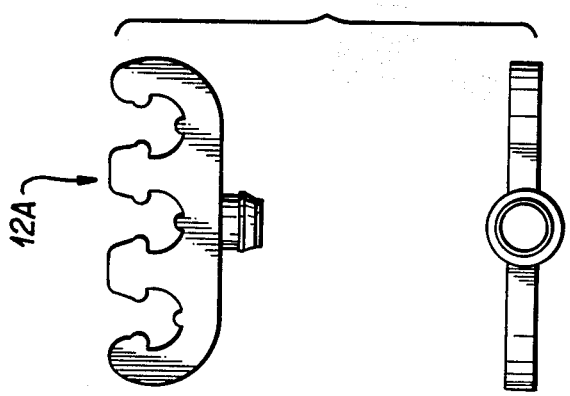

SPARK PLUG WIRE LOOM

BACKGROUND

High performance automobile engine compartments are very crowded. This makes it difficult to keep spark plug wires separated from one another and away from headers and hot spots. It is known to use separators to help keep wires away from each other, but separators cannot by themselves keep wires away from hot spots that may melt insulation or otherwise damage the wires. Accordingly, spark plug wire looms have been devised to support separators and guide spark wires via permanent paths through the engine compartment while keeping the wires away from hot spots.

An example of a current state-of-the-art spark plug wire loom is the Moroso spark plug wire loom, Product No. 712150. Like other current spark plug wire looms, it has a separator rigidly affixed to a bracket that is rigidly attached to the engine block or valve covers; typically, a right angle bracket is used that bolts into the engine block. It is not possible then to remove the valve covers without taking the spark plug wires out of the spark plug wire loom or separating the valve cover wing nut and spark plug wire loom. This frequently results in accidental cross-wiring of spark plugs when the valve covers are replaced.

Although the foregoing difficulties have existed for a long time, to date no device has been provided that overcomes them. It is believed that no device has ever been disclosed for spark plug wire separation that conveniently mounts on fasteners already present in the engine compartment (such as the valve cover wing nuts); retains that fastener; permits the fastener to carry out its ordinary function with hindrance; and insulates, routes, and separates the spark plug wires. The objects of this invention include providing means for accomplishing the foregoing function.

DRAWINGS

FIG. 1 is a perspective view of the inventor's swivel spark plug wire loom inserted onto a valve cover wing nut (T-nut), and also showing two spark plug wires.

FIG. 2 shows the separator of the two-wire swivel spark plug wire loom of FIG. 1 in a plan view and a bottom view.

FIGS. 2A-2C show similar views of 3-wire, 4-wire, and 1-wire devices.

FIG. 3 shows a T-nut mount unit in a plan view and a top view.

SUMMARY

The swivel spark plug wire loom of this invention provides an axially rotatable spark plug wire loom that routes and supports wiring. The means for providing rotation also holds the wire separator part of the device engaged with the part that mounts the device to the automobile body. The preferred embodiment rotatably mounts a separator to a T-nut mount by means of a tapered head and shaft on the bottom of the separator that pops into place into a recess in the T-nut mount.

DETAILED DESCRIPTION OF PREFERRED EMBODIMENT

The spark plug wire loom of this invention, hereinafter referred to at times as a swivel spark plug wire loom, consists of two basic parts, a T-nut mount 10 and a Separator 12. T-nut mount 10 is adapted to fit over a conventional valve cover wing nut (T-nut) 14, as shown in FIG. 1. T-nut mount 10 and Separator 12 are both made of a strong, flexible, resilient material, such as Nylon 6, which will compress under pressure and then resume its former shape when the pressure is removed.

Separator 12, shown in greater detail in FIG. 2, is rotatably mounted to T-nut mount 10, as explained below, and separates and routes spark plug wires 16 and 16a, as shown in FIG. 1. Separator 12 of FIG. 2 is a 2-wire Separator. FIG. 2A shows a 3-wire Separator 12a, which can separate and route three spark plug wires. Similarly, Separator 12b of FIG. 2B can do the same with four spark plug wires. Separators 12a and 12b otherwise operate like Separator 12. FIG. 2C shows a 1-wire unit 12c for routing a single wire.

As shown in FIG. 3, T-nut mount 10 is a tubular member with an outer diameter of approximately 0.5 inches. It has a keyhole-shaped opening 18 cutting transversely through its lower third. Opening 18 is adapted to receive and retain cross-bar 20 of valve cover wing nut 14. Lower portion 22 of T-nut mount 10, which comprises the lower 80-85% thereof, has an inner diameter of approximately 0.375 inches, which makes a convenient fit over most conventional valve cover wing nuts. Upper portion 24 of T-nut mount 10, comprising about 15-20% thereof, has an inner diameter of approximately 0.355 inches.

Returning to FIG. 2, it is seen that at the bottom of Separator 12 is a tapered head 26, attached to Separator 12 by a shaft 28. Head 26 is adapted to be pressed into and fit within the inner part of tubular T-nut mount 10, so that head 26 is firmly retained below the place in T-nut mount 10 where the inner diameter thereof changes from 0.375 to 0.355 inches. Tapered head 26 has a lower diameter of approximately 0.325 inches, so that it easily enters upper portion 24 of T-nut mount 10. Tapered head 26 has an upper diameter of approximately 0.365 inches, so that the head is compressed as it is pushed into upper portion 24, but the compression is released when head 26 reaches lower portion 22, where the inner diameter is 0.375 inches. Head 26 then expands to its normal diameter, 0.365 inches, and is held firmly in place, although it can rotate within T-nut mount 10. The taper of head 26 is approximately 16°.

Head 26 is free to rotate within T-nut mount 10 because shaft 28, which is right above head 26, has an outer diameter of approximately 0.345 inches. Since the inner diameter of upper portion 24 is 0.355 inches, shaft 28 may rotate. The longitudinal dimension of shaft 28 is slightly greater than the longitudinal dimension of upper portion 24, to make a free fit.

It will be noted that the transitions from one diameter to another within T-nut mount 10 and between shaft 28 and head 26 provide transverse seats or "lips," which lock the parts in place.

Referring to FIG. 2, it is seen that shaft 28 supports above it spark plug wire retainer 30, in which are located apertures 32 and 32a for holding spark plug wires 16 and 16a. (FIGS. 2A-2C show retainers for holding 3, 4, and 1 wire, respectively.)

The device can be used in the following manner: Separator 12 is pressed into T-nut mount 10 until the widest part of tapered head 26 pops through upper portion 24 of T-nut mount 10 and locks into place in lower portion 22 of T-nut mount 10. As head 26 is pressed into upper portion 24, head 26 is compressed and upper portion 24 is expanded out, but head 26 and upper portion 24 regain their original shapes and sizes after head 26 reaches lower portion 24. Now, Separator 12 will rotate relative to T-nut mount 10 with a slight frictional resistance. The two parts are engaged and cannot be separated longitudinally.

The device is then placed on a standard type valve cover wing nut 14 (also called a T-nut) which is on the automobile engine. The keyhole shaped opening 18 in T-nut mount 10 is pressed against the valve cover nut's cross-bar 20 until cross-bar 20 snaps into place. Standard valve cover wing nuts have a cross-bar of approximately 0.1875 inches diameter. Hence the circular part of keyhole opening 18 has a diameter of approximately 0.187 inches to provide a good tight fit, while the lower part of the keyhole has a width of approximately 0.17 inches, to make the device stay in place once it has been snapped over cross-bar 20. As before, the plastic parts deform somewhat while they are compressed, but they resume their original shapes and sizes after they are in place.

Once all of the swivel spark plug wire looms that are needed to route a wiring system are in place on the engine, i.e., are mounted on appropriate T-nuts, which have previously been properly screwed down onto the engine, the spark plug wires are pressed down into the wire retainers on the separators. The placement pattern will depend on the make of engine on which the swivel spark plug wire looms are installed.

The swivel mechanism of the foregoing swivel spark plug wire loom permits easy routing of the spark plug wires, while maintaining their separation from one another and keeping them away from hot spots. Pressing the devices over the cross-bars of valve cover wing nuts, instead of coneventionally bolting them to the engine block, makes it easier to service the engine (such as by removing valve covers) without disturbing the wiring configuration. While the device is intended primarily for spark plug wiring, it may be adapted to other automotive wiring purposes by changing the size of the apertures for holding wires.

It will be appreciated that variations in structure can be devised without departing from the spirit and concept of this invention. For example, the inventor believes that the most convenient means for rotatably mounting Separator 12 to T-nut mount 10 is by having a shaft 28 with a tapered head 26 penetrate into a tube or sleeve with two different circular cross-sections, one of which (that of the upper portion of the sleeve) has a diameter greater than that of shaft 28 but less than that of the top of head 26, while the other one (that of the lower portion of the sleeve) has a diameter greater than that of the top of head 26. But the same result can be accomplished by other expedients. First, the head and shaft could be placed on the lower member and the recess to receive them on the upper member, although it is believed that this would be less convenient.

Second, the outer diameter of the bottom of the head does not need to be smaller than the shaft diameter. It need only be enough smaller than the diameter of the upper recess portion to permit and easy penetration.

Third, the head can be spherical or pyramidal, for example, instead of being a frustrum of a cone. The head need not have a circular cross section, although the portion of Separator 12 within which the head rotates should preferably (but, again, need not) have a circular cross-section.

An arrangement could be devised, also, in which a member like a closed umbrella was inserted into the recess, so that once there it would be opened and could no longer be extracted (like a Molly bolt). Other expedients include driving a cotter pin or split washer onto a circumferential groove of a shaft, driving a spline longitudinally into a shaft, placing a metal washer onto a thermoplastic shaft and then melting the end of the shaft to form a "mushroom" shape, and using a threaded plastic shaft and then driving onto it a nut that deforms the threads and thereby locks the nut into place. Other means of rotatably mounting two parts together so that they engage and cannot be separated will also occur to skilled mechanics.

Not all of the cross-sections of the device need to be circular, as shown in the Figures. The lower portion of Separator 12, for example, can have a square cross-section, inside and out, and still function in the same manner. So, too, may the outer part of the upper portion of Separator 12.

As used in the claims, the term rotatably mounted refers to mounting two parts so that one can be rotated relative to the other (i.e., around a longitudinal axis of both parts) while still maintaining the parts mounted together, so that they cannot be disengaged.

The subject matter claimed is:

1. A device for routing wiring in an automobile, comprising:
   a first support means, for supporting at least one wire;
   adjacent to, engaged with, rotatably mounted to, and sharing a longitudinal axis with said first supporting means, a second supporting means, for supporting said first supporting means;
   affixed to or integral with said first and second supporting means, a first mounting means for engaging and mounting said first and second supporting means together, for permitting them to rotate axially on said longitudinal axis relative to one another, and for preventing them from disengaging;
   affixed to or integral with said second supporting means a second mounting means, for mounting said device directly or indirectly to a portion of said automobile.

2. The device of claim 1 wherein said first supporting means supports a plurality of wires and separates them from one another.

3. The device of claim 1 wherein:
   said second supporting means is a tubular element having a first end adjacent to said first supporting means,
   a second end longitudinally spaced from said first supporting means, and longitudinal walls extending between said first end and said second end; and
   said second mounting means is a pair of apertures shaped like keyholes and extending transversely through said walls, said keyholes having the bottoms thereof located at said second end of said second supporting means.

4. The device of claim 1 wherein said first mounting means is an extension of one said supporting means into a recess into the other said supporting means, a portion of said extension and a portion of said recess coacting to engage together both said supporting means.

5. The device of claim 4 wherein:
   said extension is longitudinal and has a plurality of extension portions which are located within said recess, which have a plurality of different cross-sections, and which have a plurality of different outer diameters respectively associated with said cross-sections;

said recess is longitudinal and has a plurality of recess portions which have a plurality of different inner diameters respectively associated therewith;

a first said extension portion is located farthest from said first supporting means and has a first outer diameter, a second said extension portion is located closer to said first supporting means than said first said extensionportion and has a second outer diameter, a third said extension portion is located closer to said first supporting means than said second said extension portion and has a third outer diameter, and said second outer diameter is greater than said first and third outer diameters;

a first said recess portion extends longitudinally from said first supporting means to a distance sufficient for said recess portion to include said third extension portion, and said recess portion has a first recess inner diameter;

a second side recess portion is longitudinally spaced from said first supporting means at a distance sufficient for said recess portion to include both said first and second extension portions, and said recess portion has a second recess inner diameter; and said second recess inner diameter is greater than said second outer diameter, said second outer diameter is greater than said first recess inner diameter, said first recess inner diameter is greater than said third outer diameter, and said first recess inner diameter is greater than said first outer diameter.

6. The device of claim 4 wherein:

said second supporting means is a hollow, cylindrical tube having a first longitudinal portion adjacent to said first supporting means and a second longitudinal portion adjacent to said first portion and longitudinally spaced from said first supporting means;

said first portion has a first inner diameter, said second portion has a second inner diameter, and said second inner diameter is greater than said first inner diameter;

said recess is the space within said hollow tube;

said extension comprises:

a cylindrical shaft extending longitudinally from said first supporting means into said tube, having an outer shaft end which is longitudinally spaced from said first supporting means, and having a shaft diameter; and affixed to said outer shaft end, a tapered head having a base end and a tip end, said base end being adjacent to said outer shaft end, said tip end being longitudinally spaced from said outer shaft end, said base end having a base diameter, said base diameter being greater than said shaft diameter, said tip end having a tip diameter, and said head so tapering that said base diameter is greater than said tip diameter;

said second inner diameter is greater than said base diameter of said head, said base diameter of said head is greater than said first inner diameter, said first inner diameter is greater than said shaft diameter, and said first inner diameter is greater than said tip diameter of said head.

7. A automotive swivel spark plug wire loom made of elastic, resilient material and comprising, in combination:

a T-nut mount unit, comprising a hollow, circular cylinder with an upper end and a lower end, within which cylinder are longitudinally disposed an upper section extending from said upper end to a middle region of said cylinder, and a lower section extending from said middle region to said lower end, said lower section having an inner diameter greater than that of said upper section, and said lower section having walls transversely pierced by a pair of keyhole shaped openings 180° apart where the bottoms of said keyholes are located at said lower end; and engaged with and rotatably mounted to said T-nut mount unit, a separator having an upper section and a lower section;

said lower section of said separator having a penetrator element extending into said T-nut mount unit, said penetrator unit comprising:

a circular cylindrical shaft extending into said upper section of said T-nut mount unit, longitudinally extending entirely through said upper section to said lower section of said T-nut mount unit and to an outer end of said shaft, said shaft having an outer diameter less than the inner diameter of said upper section of said T-nut mount unit; and integral with said shaft a generally cone-frustrum shaped head having a base adjacent to said outer end of said shaft, said base having an outer diameter greater than the inner diameter of said upper section of said T-nut mount unit and less than the inner diameter of said lower section of said T-nut mount unit, said head having a tip end longitudinally spaced from said base and having a diameter less than the inner diameter of said upper section of said T-nut mount unit, and said head being located wholly within said lower section of said T-nut mount unit—whereby said separator is engaged with and rotatably mounted to said T-nut mount unit and said separator and said T-nut mount unit cannot be disengaged from one another; and said upper section of said separator having a plurality of spaced apertures adapted to receive and hold spark plug wires.

8. In a spark plug wire loom for an automobile engine compartment, comprising a separator element longitudinally spaced from a support element and mounted thereto by a mounting means, the improvement comprising: a rotatably said mounting means for so mounting said separator element to said support element that both said elements can rotate relative to one another around a longitudinal axis but cannot be longitudinally separated or disengaged from one another.

9. The device of claim 8 wherein said means comprises a longitudinal extension of one said element, said extension being made of an elastic, resilient material, said extension having a first transverse diameter at a location longitudinally spaced from said element and a second transverse diameter at a location more distantly longitudinally spaced from said element, said second diameter being greater than said first diameter, said extension being longitudinally forced into a recess in the other said element via an opening into said recess, said recess opening having a transverse diameter less than said second transverse diameter of said extension and greater than said first transverse diameter of said extension.

10. The device of claim 8 wherein said support element has a means for press-fitting said support element over a T-nut cross-bar.

* * * * *